(12) United States Patent
Miyazaki et al.

(10) Patent No.: US 9,994,699 B2
(45) Date of Patent: Jun. 12, 2018

(54) TIRE RUBBER COMPOSITION AND PNEUMATIC TIRE

(71) Applicant: SUMITOMO RUBBER INDUSTRIES, LTD., Kobe-shi, Hyogo (JP)

(72) Inventors: Tatsuya Miyazaki, Kobe (JP); Ryuichi Tokimune, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days. days.

(21) Appl. No.: 14/900,529

(22) PCT Filed: Jun. 12, 2014

(86) PCT No.: PCT/JP2014/065561
§ 371 (c)(1),
(2) Date: Dec. 21, 2015

(87) PCT Pub. No.: WO2015/001935
PCT Pub. Date: Jan. 8, 2015

(65) Prior Publication Data
US 2016/0177072 A1    Jun. 23, 2016

(30) Foreign Application Priority Data

Jul. 5, 2013 (JP) ................. 2013-141962
Jan. 8, 2014 (JP) ................. 2014-001827

(51) Int. Cl.
| | |
|---|---|
| *C08L 9/00* | (2006.01) |
| *C08K 3/36* | (2006.01) |
| *B60C 1/00* | (2006.01) |
| *C08K 5/10* | (2006.01) |
| *C08K 5/18* | (2006.01) |
| *C08L 7/00* | (2006.01) |
| *C08L 91/06* | (2006.01) |

(52) U.S. Cl.
CPC ............... *C08L 9/00* (2013.01); *B60C 1/00* (2013.01); *B60C 1/0016* (2013.01); *B60C 1/0025* (2013.01); *C08K 3/36* (2013.01); *C08K 5/10* (2013.01); *C08K 5/18* (2013.01); *C08L 7/00* (2013.01); *B60C 2001/005* (2013.01); *C08L 91/06* (2013.01); *C08L 2205/02* (2013.01)

(58) Field of Classification Search
CPC .................................. C08L 9/00; C08K 3/36
USPC .................................. 524/496, 254
See application file for complete search history.

(56) References Cited

U.S. PATENT DOCUMENTS

| | | |
|---|---|---|
| 2001/0051677 A1 | 12/2001 | Bataille et al. |
| 2004/0198876 A1* | 10/2004 | Shiraishi ............ C08K 5/06 524/110 |
| 2008/0161462 A1 | 7/2008 | York et al. |
| 2011/0166254 A1* | 7/2011 | Nishimura ............ B60C 1/0016 523/155 |
| 2013/0102714 A1 | 4/2013 | Recker et al. |
| 2013/0184387 A1 | 7/2013 | Tahara et al. |
| 2014/0011944 A1 | 1/2014 | Kondo |
| 2014/0100321 A1* | 4/2014 | Maejima ............ C08C 19/34 524/506 |
| 2014/0202609 A1 | 7/2014 | Miyazaki |

FOREIGN PATENT DOCUMENTS

| | | |
|---|---|---|
| CN | 101613493 A | 12/2009 |
| CN | 102952296 A | 3/2013 |
| CN | 103097449 A | 5/2013 |
| EP | 2 604 650 A1 | 6/2013 |
| EP | 2 716 700 A1 | 4/2014 |
| GB | 2 149 671 A | 6/1985 |
| JP | 63-213536 A | 9/1988 |
| JP | 5-179071 A | 7/1993 |
| JP | 5-194790 A | 8/1993 |
| JP | 2006-213864 A | 8/2006 |
| JP | 2012-36351 A | 2/2012 |
| JP | 2012-57153 A | 3/2012 |
| JP | 2012-111795 A | 6/2012 |
| WO | WO2012/144605 | * 10/2012 |
| WO | WO 2013/046804 A1 | 4/2013 |

OTHER PUBLICATIONS

Goodyear International Corporation, "Budene 1207/1208," Product Data Sheet, Oct. 1, 2012, URL: http://www.goodyearchemical.com/pdf/Bud1207_Bud1208.pdf, 1 page, XP-002740785.

Nobuaki, "Rubber Compositions with Improved Appearance," Chemical Abstracts Service, Database Accession No. 1989:59311, Feb. 17, 1989, (JP S63 213536, Ohtsu Tire & Rubber Co LTD, Sep. 6, 1988), pp. 1-2, XP-002765391.

Shanghai Polydex Industry Co., Ltd, "Rubber Antiozon Wax (Paraffin Waxes)", Retrieved from the Internet: URL: http://www.polydex.com/jrdetaile.php?id=184 on Dec. 20, 2016, 1 page, XP-002765392.

(Continued)

*Primary Examiner* — Deve E Valdez
(74) *Attorney, Agent, or Firm* — Birch, Stewart, Kolasch & Birch, LLP

(57) ABSTRACT

Provided are a rubber composition for tires preventing discoloration and improving ozone resistance while maintaining or improving good elongation at break and good fuel economy, and a pneumatic tire using the rubber composition. Included is a rubber composition for tires including: a rubber component including at least one selected from the group consisting of a specific non-oil extended polybutadiene rubber and a specific oil extended polybutadiene rubber; a phenylenediamine antioxidant; a specific nonionic surfactant; and carbon black and/or silica, the rubber composition having an amount of diene rubber of 70-100% by mass per 100% by mass of the rubber component, the rubber composition having an amount of the phenylenediamine antioxidant of 1.0-8.0 parts by mass, an amount of the nonionic surfactant of 0.1-5.0 parts by mass, and a combined amount of carbon black and silica of 20-45 parts by mass, each per 100 parts by mass of the rubber component.

19 Claims, No Drawings

(56) References Cited

OTHER PUBLICATIONS

English translation of the Chinese Office Action for Chinese Application No. 201480035636.8, dated Nov. 28, 2016.
Meng, "10000 examples of application formulation of fine chemical engineering and practical manual of producing process, vol. One," Yinsheng Audio-video Press, Feb. 29, 2004, pp. 695-696 (4 pages total).
Song et al., "Training technology of fine chemical engineering," The Technology of Fine Chemical Industry, Tianjin University Press, Sep. 30, 2008, pp. 61-62 (4 pages total).

* cited by examiner

TIRE RUBBER COMPOSITION AND PNEUMATIC TIRE

TECHNICAL FIELD

The present invention relates to a rubber composition for tires and a pneumatic tire using the rubber composition.

BACKGROUND ART

Since automobile tires are manufactured using rubber compositions made from natural rubber and/or synthetic diene rubbers, degradation of such tires is accelerated at high oxygen or ozone concentrations or under ultraviolet rays, which may result in the formation of cracks. In order to suppress crack formation and growth in the presence of ozone, for example, additives such as antioxidants, e.g., N-(1,3-dimethylbutyl)-N'-phenyl-p-phenylenediamine (6PPD) or poly(2,2,4-trimethyl-1,2-)dihydroquinoline (TMDQ), or petroleum wax are used in rubber compositions.

The antioxidants and petroleum wax in rubber vulcanizates migrate (bloom) to the rubber surface of, for example, tires, thereby serving to protect the rubbers from ozone. Unfortunately, excessive blooming of the antioxidants and petroleum wax in a short period of time causes white discoloration. Moreover, the antioxidants oxidized by ozone cause brown discoloration, and similar excessive blooming of them intensifies brown discoloration. Furthermore, if the wax and the like bloomed on the tire surface form an uneven bloom layer (surface-protecting layer), diffuse reflection of light occurs, making the brown discoloration caused by the degraded antioxidants more noticeable. Thus, it has been difficult to improve ozone resistance while preventing discoloration.

Patent Literature 1 describes that the addition of a polyoxyethylene ether nonionic surfactant prevents deterioration of the appearance of tires. This technique still leaves room for improvement in terms of preventing discoloration and improving ozone resistance while maintaining or improving good elongation at break and good fuel economy.

CITATION LIST

Patent Literature

Patent Literature 1: JP H05-194790 A

SUMMARY OF INVENTION

Technical Problem

The present invention aims to solve the above problem and provide a rubber composition for tires capable of preventing discoloration and improving ozone resistance while maintaining or improving good elongation at break and good fuel economy, and a pneumatic tire using the rubber composition.

Solution to Problem

The present invention relates to a rubber composition for tires, containing:
a rubber component including at least one selected from the group consisting of a non-oil extended polybutadiene rubber that has a cis content of 95% by mass or more and a Mooney viscosity ($ML_{1+4}$, 100° C.) of 50 or more and an oil extended polybutadiene rubber that has a cis content of 95% by mass or more and a weight average molecular weight (Mw) of 420,000 or higher;
a phenylenediamine antioxidant;
a nonionic surfactant; and
at least one of carbon black or silica,
the non-oil extended polybutadiene rubber being at least one selected from the group consisting of a polybutadiene rubber synthesized using a rare earth catalyst and a polybutadiene rubber containing 1,2-syndiotactic polybutadiene crystals,
the nonionic surfactant being at least one selected from the group consisting of a Pluronic-type nonionic surfactant and at least one of nonionic surfactants represented by Formula (1) or Formula (2) below,
the rubber composition having an amount of diene rubber of 70 to 100% by mass based on 100% by mass of the rubber component,
the rubber composition having an amount of the phenylenediamine antioxidant of 1.0 to 8.0 parts by mass, an amount of the nonionic surfactant of 0.1 to 5.0 parts by mass, and a combined amount of carbon black and silica of 20 to 45 parts by mass, each per 100 parts by mass of the rubber component,

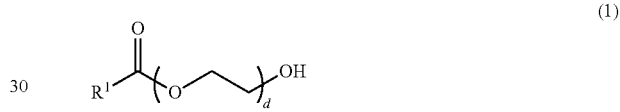

wherein $R^1$ represents a C6-C26 hydrocarbon group, and d represents an integer,

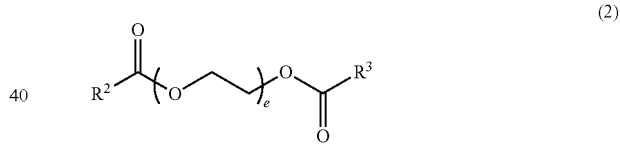

wherein $R^2$ and $R^3$ are the same or different and each represent a C6-C26 hydrocarbon group, and e represents an integer.

Preferably, the rubber composition for tires contains, based on 100% by mass of the rubber component, 15 to 70% by mass of the non-oil extended polybutadiene rubber or 5 to 50% by mass of a polybutadiene rubber component contained in the oil extended polybutadiene rubber, or contains, based on 100% by mass of the rubber component, 15 to 70% by mass of the non-oil extended polybutadiene rubber and 5 to 50% by mass of a polybutadiene rubber component contained in the oil extended polybutadiene rubber.

The non-oil extended polybutadiene rubber preferably has a Mooney viscosity ($ML_{1+4}$, 100° C.) of 60 or more.

Preferably, an amount of petroleum-derived wax is 6.0 parts by mass or less per 100 parts by mass of the rubber component.

Preferably, based on 100% by mass of the petroleum-derived wax, a combined amount of C20 to C32 normal alkanes is 25 to 50% by mass and a combined amount of C33 to C44 normal alkanes is 25 to 50% by mass.

The rubber composition for tires is preferably a rubber composition for tire outer layers.

The present invention also relates to a pneumatic tire, formed from the rubber composition.

Advantageous Effects of Invention

The present invention provides a rubber composition for tires containing: a rubber component including at least one selected from the group consisting of a specific non-oil extended polybutadiene rubber that has a cis content of 95% by mass or more and a Mooney viscosity ($ML_{1+4}$, 100° C.) of 50 or more and an oil extended polybutadiene rubber that has a cis content of 95% by mass or more and a weight average molecular weight (Mw) of 420,000 or higher, the rubber component including a predetermined amount of diene rubber; a predetermined amount of a phenylenediamine antioxidant; a predetermined amount of a specific nonionic surfactant; and a predetermined amount of carbon black and/or silica. Such a rubber composition for tires is capable of preventing discoloration and improving ozone resistance while maintaining or improving good elongation at break and good fuel economy.

DESCRIPTION OF EMBODIMENTS

The rubber composition for tires of the present invention contains: a rubber component including at least one selected from the group consisting of a specific non-oil extended polybutadiene rubber that has a cis content of 95% by mass or more and a Mooney viscosity ($ML_{1+4}$, 100° C.) of 50 or more and an oil extended polybutadiene rubber that has a cis content of 95% by mass or more and a weight average molecular weight (Mw) of 420,000 or higher, the rubber component including a predetermined amount of diene rubber; a predetermined amount of a phenylenediamine antioxidant; a predetermined amount of a specific nonionic surfactant; and a predetermined amount of carbon black and/or silica. Such a rubber composition can exhibit excellent ozone resistance over a wide temperature range and at the same time can be sufficiently prevented from suffering brown discoloration and white discoloration on the tire surface, so that these properties are simultaneously ensured. The rubber composition for tires of the present invention has both discoloration resistance and ozone resistance while maintaining or improving good elongation at break and good fuel economy as described above, presumably for the following reasons.

The specific surfactant blooms to the tire surface together with wax and antioxidants and melts and flattens them, as a result of which white discoloration can be diminished and, at the same time, the irregularities of the surface-protecting layer formed on the tire surface are reduced so that brown discoloration, which is noticeable under diffuse reflection, can be greatly diminished. Further, a shiny black luster is imparted to the tire surface, and ozone resistance is also improved. However, although the addition of the specific surfactant enables discoloration resistance and ozone resistance to be ensured simultaneously, it creates the following new problems: The rubber composition has a reduced viscosity and exhibits increased lubricity during kneading, which makes it difficult to transmit the torque of the kneading machine so as to disperse filler. As a result, silica and carbon black are less dispersed so that fuel economy and elongation at break are reduced. In order to solve the problems, the rubber composition of the present invention contains a high viscosity polybutadiene rubber such as the specific non-oil extended polybutadiene rubber or the specific oil extended polybutadiene rubber together with the specific surfactant. Such a rubber composition has both discoloration resistance and ozone resistance while maintaining or improving good elongation at break and good fuel economy, and thus can exhibit excellent ozone resistance over a wide temperature range and at the same time can sufficiently suppress discoloration. Moreover, when such a polybutadiene rubber having a relatively high molecular weight as the specific non-oil extended polybutadiene rubber or the specific oil extended polybutadiene rubber is used, the number of polymer chain ends is reduced and the energy loss due to their free movement decreases; in addition, the polymer can easily be tightly entangled with other polymers or filler and thus is less likely to be unfastened therefrom. As a result, good fuel economy, good elongation at break, and good crack growth resistance are achieved.

According to the present invention, the rubber component includes at least one selected from the group consisting of a non-oil extended polybutadiene rubber having a cis content of 95% by mass or more and a Mooney viscosity ($ML_{1+4}$, 100° C.) of 50 or more (non-oil extended polybutadiene rubber) and an oil extended polybutadiene rubber having a cis content of 95% by mass or more and a weight average molecular weight (Mw) of 420,000 or higher (oil extended polybutadiene rubber).

The oil extended polybutadiene rubber refers to a rubber prepared by adding an extending component such as oil to polybutadiene rubber in the production of the polymer. The non-oil extended polybutadiene rubber refers to a rubber prepared without adding an extending component to polybutadiene rubber.

First, the non-oil extended polybutadiene rubber will be described. The non-oil extended polybutadiene rubber has a cis content of 95% by mass or more and a Mooney viscosity ($ML_{1+4}$, 100° C.) of 50 or more, and is at least one selected from the group consisting of a polybutadiene rubber synthesized using a rare earth catalyst and a polybutadiene rubber containing 1,2-syndiotactic polybutadiene crystals.

The non-oil extended polybutadiene rubber has a cis content of 95% by mass or more, preferably 96% by mass or more. If the non-oil extended polybutadiene rubber has a cis content of less than 95% by mass, good abrasion resistance or good elongation at break cannot be obtained. The maximum cis content is not particularly limited.

The non-oil extended polybutadiene rubber has a Mooney viscosity ($ML_{1+4}$, 100° C.) of 50 or more, preferably 60 or more. If the non-oil extended polybutadiene rubber has a Mooney viscosity of less than 50, the rubber composition cannot simultaneously achieve discoloration resistance and ozone resistance while maintaining or improving good elongation at break and good fuel economy. Moreover, the maximum Mooney viscosity is not particularly limited, but is preferably 80 or less, more preferably 70 or less. If the Mooney viscosity is more than 80, the polymer is less likely to be dispersed and also less likely to incorporate filler, with the result that crack growth resistance and elongation at break tend to be deteriorated.

The Mooney viscosity ($ML_{1+4}$, 100° C.) is determined by measuring Mooney viscosity at 100° C. in conformity with JIS K 6300.

The non-oil extended polybutadiene rubber preferably has a high molecular weight to satisfy the above Mooney viscosity. Specifically, the non-oil extended polybutadiene rubber preferably has a weight average molecular weight (Mw) of 400,000 or higher, more preferably 500,000 or higher, still more preferably 560,000 or higher. Moreover, the maximum Mw is not particularly limited, but is preferably 900,000 or lower, more preferably 700,000 or lower. If the Mw is higher than 900,000, the polymer is less likely to be dispersed and also less likely to incorporate filler, with the result that crack growth resistance and elongation at break tend to be deteriorated.

The non-oil extended polybutadiene rubber preferably contains a large amount of 1,2-syndiotactic polybutadiene crystals (SPB) to satisfy the above Mooney viscosity. Specifically, the SPB content in the non-oil extended polybutadiene rubber is preferably 14% by mass or more, more preferably 16% by mass or more. Moreover, the maximum SPB content is not particularly limited, but is preferably 21% by mass or less, more preferably 20% by mass or less. If the SPB content is more than 21% by mass, the polymer is less likely to be dispersed and also less likely to incorporate filler, with the result that crack growth resistance and elongation at break tend to be deteriorated.

Since SPB-containing BR has a high viscosity due to the bonding of SPB to the BR matrix, BR containing not less than a specific amount of SPB satisfies the above Mooney viscosity.

Thus, the non-oil extended polybutadiene rubber is preferably a BR having a weight average molecular weight within the above range or a BR containing not less than a specific amount of SPB. The BR having a weight average molecular weight within the above range is also preferably a BR synthesized using a rare earth catalyst (rare earth-catalyzed BR). The rare earth-catalyzed BR has a high cis content and a low vinyl content and therefore not only has good abrasion resistance but also provides good fuel economy, good elongation at break, and good crack growth resistance.

In a preferred embodiment of the SPB-containing BR, in view of abrasion resistance and extrusion processability, and in order to easily satisfy the above Mooney viscosity, SPB crystals are not merely dispersed in BR but are chemically bonded to BR and dispersed therein. The SPB preferably has a melting point of 180° C. to 220° C. The SPB content in the SPB-containing BR is preferably 2.5 to 20% by mass. The SPB content in the SPB-containing BR refers to the amount of boiling n-hexane insolubles.

In the case of the rubber composition of the present invention containing SPB-containing BR as the non-oil extended polybutadiene rubber, the amount of SPB-containing BR based on 100% by mass of the rubber component is preferably 5% by mass or more, more preferably 10% by mass or more. The amount is preferably 70% by mass or less, more preferably 60% by mass or less, still more preferably 40% by mass or less. When the amount of SPB-containing BR is within the above range, the effects of the present invention can be more suitably achieved.

Next, the rare earth-catalyzed BR will be described.

The rare earth-catalyzed BR refers to a polybutadiene rubber synthesized using a rare earth catalyst, and features a high cis content and a low vinyl content. As the rare earth-catalyzed BR, those commonly used in the production of tires can be used.

The rare earth catalyst may be a known one and examples include catalysts containing lanthanide rare earth compounds, organic aluminum compounds, aluminoxanes, or halogen-containing compounds, optionally with Lewis bases. Among these, Nd catalysts are especially preferred which contain neodymium (Nd)-containing compounds as lanthanide rare earth compounds.

Examples of the lanthanide rare earth compounds include halides, carboxylates, alcholates, thioalcholates, and amides of rare earth metals of atomic numbers 57 to 71. As described above, Nd catalysts are preferred among these because they allow the resulting BR to have a high cis content and a low vinyl content.

Examples of the organic aluminum compounds include compounds represented by $AlR^aR^bR^c$, where $R^a$, $R^b$ and $R^c$ are the same or different and each represent hydrogen or a hydrocarbon group having 1 to 8 carbon atoms. Examples of the aluminoxanes include acyclic aluminoxanes and cyclic aluminoxanes. Examples of the halogen-containing compounds include aluminum halides represented by $AlX_kR^d_{3-k}$, where X represents a halogen; $R^d$ represents a C1-20 alkyl, aryl or aralkyl group; and k represents 1, 1.5, 2 or 3; strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. Lewis bases are used for complexation of lanthanide rare earth compounds, and suitable examples include acetylacetone, ketones and alcohols.

In butadiene polymerization, the rare earth catalyst may be used in solution in an organic solvent (e.g. n-hexane, cyclohexane, n-heptane, toluene, xylene, or benzene) or may be supported on an appropriate carrier, such as silica, magnesia, or magnesium chloride. Regarding the polymerization conditions, the polymerization may be either solution polymerization or bulk polymerization, and the polymerization temperature is preferably −30° C. to 150° C., and the polymerization pressure may be appropriately chosen depending on other conditions.

The rare earth-catalyzed BR preferably has a ratio (Mw/Mn) of the weight average molecular weight (Mw) to the number average molecular weight (Mn) of 1.2 or higher, more preferably 1.5 or higher. At a ratio of lower than 1.2, processability tends to be markedly deteriorated. The ratio Mw/Mn is preferably 5.0 or lower, more preferably 4.5 or lower, still more preferably 4.0 or lower, particularly preferably 3.5 or lower. At a ratio of higher than 5.0, the effect of improving abrasion resistance tends to be reduced.

The rare earth-catalyzed BR preferably has a vinyl content of 1.8% by mass or less, more preferably 1.0% by mass or less, still more preferably 0.9% by mass or less. If the rare earth-catalyzed BR has a vinyl content of more than 1.8% by mass, abrasion resistance may be reduced. The minimum vinyl content is not particularly limited.

In the case of the rubber composition of the present invention containing rare earth-catalyzed BR as the non-oil extended polybutadiene rubber, the amount of rare earth-catalyzed BR based on 100% by mass of the rubber component is preferably 5% by mass or more, more preferably 10% by mass or more. The amount is preferably 70% by mass or less, more preferably 60% by mass or less, still more preferably 40% by mass or less. When the amount of rare earth-catalyzed BR is within the above range, the effects of the present invention can be more suitably achieved.

Examples of the non-oil extended polybutadiene rubber include VCR617 (SPB-containing BR, SPB content: 17% by mass, cis content: 96% by mass, Mooney viscosity ($ML_{1+4}$, 100° C.): 62) available from Ube Industries, Ltd., BUNA-CB22 (rare earth-catalyzed BR synthesized using a Nd catalyst, Mw: 590,000, cis content: 97% by mass, Mooney viscosity ($ML_{1+4}$, 100° C.): 63) available from LANXESS, and BR730 (rare earth-catalyzed BR synthesized using a Nd catalyst, Mw: 580,000, cis content: 97% by mass, Mooney viscosity ($ML_{1+4}$, 100° C.): 51) available from JSR Corporation.

In the case of the rubber composition of the present invention containing the non-oil extended polybutadiene rubber, the amount of the non-oil extended polybutadiene rubber based on 100% by mass of the rubber component is preferably 5% by mass or more, more preferably 15% by mass or more. The amount is preferably 70% by mass or less, more preferably 60% by mass or less, still more preferably 40% by mass or less. When the amount of the non-oil extended polybutadiene rubber is within the above range, the effects of the present invention can be more suitably achieved.

Next, the oil extended polybutadiene rubber will be described. The oil extended polybutadiene rubber has a cis content of 95% by mass or more and a weight average molecular weight (Mw) of 420,000 or higher.

The oil extended polybutadiene rubber has a cis content of 95% by mass or more, preferably 96% by mass or more. If the oil extended polybutadiene rubber has a cis content of less than 95% by mass, good abrasion resistance or good elongation at break cannot be obtained. The maximum cis content is not particularly limited.

The oil extended polybutadiene rubber has a weight average molecular weight (Mw) of 420,000 or higher, preferably 450,000 or higher, more preferably 500,000 or higher, still more preferably 600,000 or higher, particularly preferably 700,000 or higher. Moreover, the maximum Mw is not particularly limited, but is preferably 1,000,000 or lower, more preferably 950,000 or lower, still more preferably 900,000 or lower. If the oil extended polybutadiene rubber has a Mw of higher than 1,000,000, the polymer is less likely to be dispersed and also less likely to incorporate filler, with the result that crack growth resistance and elongation at break tend to be deteriorated.

Herein, the cis content (cis-1,4-butadiene unit content) and the vinyl content (1,2-butadiene unit content) in BR can be determined by infrared absorption spectrometry. The weight average molecular weight (Mw) and the number average molecular weight (Mn) of BR are measured using a gel permeation chromatograph (GPC) (GPC-8000 series available from Tosoh Corporation, detector: differential refractometer, column: TSKGEL SUPERMULTIPORE HZ-M available from Tosoh Corporation) and calibrated with polystyrene standards.

In the oil extended polybutadiene rubber, the amount of the extending component per 100 parts by mass of the rubber component is, for example, but not limited to, 10 to 50 parts by mass.

The oil extended polybutadiene rubber is preferably a BR synthesized using a rare earth catalyst (rare earth-catalyzed BR). The rare earth-catalyzed BR has a high cis content and a low vinyl content and therefore not only has good abrasion resistance but also provides good fuel economy, good elongation at break, and good crack growth resistance. The rare earth-catalyzed BR may be a similar suitable embodiment as mentioned for the earlier described rare earth-catalyzed BR.

In the case of the rubber composition of the present invention containing rare earth-catalyzed BR as the oil extended polybutadiene rubber, the amount of rare earth-catalyzed BR based on 100% by mass of the rubber component is preferably 5% by mass or more, more preferably 15% by mass or more. The amount is preferably 50% by mass or less, more preferably 40% by mass or less, still more preferably 35% by mass or less. When the amount of rare earth-catalyzed BR is within the above range, the effects of the present invention can be more suitably achieved.

Examples of the oil extended polybutadiene rubber include BUNA-CB29 TDAE (rare earth-catalyzed BR synthesized using a Nd catalyst, containing 37.5 parts by mass of TDAE per 100 parts by mass of the rubber component; cis content: 97% by mass, Mw: 760,000, Mn: 326,000) available from LANXESS and BUNA-CB29 MES (rare earth-catalyzed BR synthesized using a Nd catalyst, containing 37.5 parts by mass of MES per 100 parts by mass of the rubber component; cis content: 97% by mass, Mw: 737,000, Mn: 191,000) available from LANXESS.

In the case of the rubber composition of the present invention containing the oil extended polybutadiene rubber, the amount of the polybutadiene rubber component contained in the oil extended polybutadiene rubber, based on 100% by mass of the rubber component is preferably 5% by mass or more, more preferably 15% by mass or more. The amount is preferably 50% by mass or less, more preferably 40% by mass or less, still more preferably 35% by mass or less. When the amount of the oil extended polybutadiene rubber satisfies the above range, the effects of the present invention can be more suitably achieved.

In addition to the non-oil extended polybutadiene rubber and/or the oil extended polybutadiene rubber, BRs other than the non-oil extended polybutadiene rubber and the oil extended polybutadiene rubber (other BRs) may be used in the present invention. Non-limiting examples of other BRs include those commonly used in the tire industry, such as high-cis content BR, for example, BR1220 available from Zeon Corporation, BR150B available from Ube Industries, Ltd. or the like, BR containing 1,2-syndiotactic polybutadiene crystals (SPB), for example, VCR412 available from Ube Industries, Ltd., and polybutadiene rubber synthesized using a rare earth catalyst (rare earth-catalyzed BR). Other examples include modified polybutadiene rubbers such as tin-modified polybutadiene rubber (tin-modified BR (modified BR for carbon black)) which has been modified with a tin compound, e.g., tin-modified BR polymerized using a lithium initiator and having a vinyl bond content of 5 to 50% by mass, an Mw/Mn of 2.0 or less, and a tin atom content of 50 to 3000 ppm. Among these, tin-modified BR is preferred.

Preferably, the tin-modified BR is prepared by polymerization of 1,3-butadiene using a lithium initiator, followed by the addition of a tin compound, and has a tin-carbon bond at a molecular chain end thereof.

Examples of the lithium initiator include lithium compounds such as alkyllithiums and aryllithiums. Examples of the tin compound include tin tetrachloride and butyltin trichloride. The tin-modified BR preferably has a tin atom content of 50 to 3000 ppm. The tin-modified BR preferably has a molecular weight distribution (Mw/Mn) of 2 or less. Moreover, the tin-modified BR preferably has a vinyl content of 5 to 50% by mass.

In the case of the rubber composition of the present invention containing tin-modified BR, the amount of tin-modified BR based on 100% by mass of the rubber component is preferably 5% by mass or more, more preferably 15% by mass or more. The amount is preferably 50% by mass or less, more preferably 40% by mass or less, still more preferably 35% by mass or less. When the amount of tin-modified BR is within the above range, the effects of the present invention can be more suitably achieved.

Examples of a rubber component usable in the present invention other than BR include diene rubbers such as isoprene-based rubbers, styrene-butadiene rubber (SBR), styrene-isoprene-butadiene rubber (SIBR), chloroprene rubber (CR), or acrylonitrile-butadiene rubber (NBR); and non-diene rubbers such as ethylene-propylene-diene rubber (EPDM), butyl rubber (IIR) or halogenated butyl rubber (X-IIR). Each of these may be used alone, or two or more of these may be used in combination. Among these, diene rubbers are preferred because they can be suitably used for tires. Further, isoprene-based rubbers and SBR are preferred among diene rubbers because they provide good durability while ensuring good handling stability, good fuel economy, and good elongation at break. More preferred are isoprene-based rubbers. For use in sidewalls or clinches, isoprene-based rubbers are preferred for good tensile strength. For use in treads, SBR is preferred for excellent grip performance.

The amount of diene rubber based on 100% by mass of the rubber component is 70% by mass or more, preferably 80% by mass or more, more preferably 90% by mass or more, and may be 100% by mass. The rubber composition containing the above amount of diene rubber can suitably enjoy the effects of the present invention and can also be suitably used as a rubber composition for tires.

Examples of isoprene-based rubbers include synthetic polyisoprene rubber (IR), natural rubber (NR), and modified natural rubber. Examples of NR include deproteinized natural rubber (DPNR) and high purity natural rubber (HPNR). Examples of modified natural rubber include epoxidized natural rubber (ENR), hydrogenated natural rubber (HNR), and grafted natural rubber. Moreover, the NR may be one commonly used in the tire industry, for example, SIR20, RSS#3, TSR20, or the like. Among these, NR or IR is preferred, and NR is more preferred.

The amount of isoprene-based rubber based on 100% by mass of the rubber component is preferably 10 to 80% by mass. In this case, good crack growth resistance and good mechanical strength can be obtained.

In the case of the rubber composition of the present invention for use in sidewalls or clinches, the amount of isoprene-based rubber based on 100% by mass of the rubber component is preferably 20% by mass or more, more preferably 30% by mass or more. If the amount is less than 20% by mass, sufficient mechanical strength may not be obtained. The amount of isoprene-based rubber is preferably 80% by mass or less, more preferably 70% by mass or less. If the amount is more than 80% by mass, crack growth resistance and the like may be reduced. Also in the case of the rubber composition of the present invention for use in treads or the like, a similar range as above may be used. The amount of isoprene-based rubber may be appropriately varied depending on whether the rubber composition is for use in passenger vehicles or in trucks and buses.

The combined amount of isoprene-based rubber and BR based on 100% by mass of the rubber component is preferably 90% by mass or more, more preferably 95% by mass or more, and may be 100% by mass. In such case, good handling stability, good fuel economy, good elongation at break, good abrasion resistance, good durability, and good crack growth resistance can be obtained.

In the present invention, at least one selected from the group consisting of a Pluronic-type nonionic surfactant and a nonionic surfactant represented by Formula (1) below and/or nonionic surfactant represented by Formula (2) below is used. Each of these nonionic surfactants may be used alone, or two or more kinds of these may be used in combination.

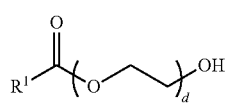
(1)

In Formula (1), $R^1$ represents a C6-C26 hydrocarbon group, and d represents an integer.

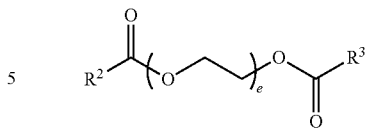
(2)

In Formula (2), $R^2$ and $R^3$ are the same or different and each represent a C6-C26 hydrocarbon group, and e represents an integer.

First, the nonionic surfactants represented by Formula (1) and/or by Formula (2) will be described. Among these surfactants, the nonionic surfactant represented by Formula (1) is preferred because the effects of the present invention can be more suitably achieved.

$R^1$ in Formula (1) represents a C6-C26 hydrocarbon group. If $R^1$ is a hydrocarbon group having 5 or less carbon atoms, such a nonionic surfactant poorly permeates through rubber and migrates to the rubber surface too fast, as a result of which the rubber surface tends to have poor appearance. Also, if $R^1$ is a hydrocarbon group having 27 or more carbon atoms, such a material is difficult to obtain or expensive and is thus inappropriate. When $R^1$ is a hydrocarbon group having a carbon number within the above range, blooming of the nonionic surfactant can be suitably controlled and the effects of the present invention can be more suitably achieved.

$R^1$ is preferably a hydrocarbon group having 8 to 24 carbon atoms, more preferably 10 to 22 carbon atoms, still more preferably 14 to 20 carbon atoms.

Examples of the C6-C26 hydrocarbon group as $R^1$ include C6-C26 alkenyl groups, C6-C26 alkynyl groups, and C6-C26 alkyl groups.

Examples of the C6-C26 alkenyl groups include 1-hexenyl, 2-hexenyl, 1-octenyl, decenyl, undecenyl, dodecenyl, tridecenyl, tetradecenyl, pentadecenyl, heptadecenyl, octadecenyl, icosenyl, tricosenyl, and hexacosenyl groups.

Examples of the C6-C26 alkynyl groups include hexynyl, heptynyl, octynyl, nonynyl, decynyl, undecynyl, dodecynyl, tridecynyl, tetradecynyl, pentadecynyl, heptadecynyl, octadecynyl, icosynyl, tricosynyl, and hexacosynyl groups.

Examples of the C6-C26 alkyl groups include hexyl, heptyl, 2-ethylhexyl, octyl, nonyl, decyl, undecyl, dodecyl, tridecyl, tetradecyl, pentadecyl, octadecyl, heptadecyl, octadecyl, icosyl, tricosyl, and hexacosyl groups.

$R^1$ is preferably a C6-C26 alkenyl group or a C6-C26 alkynyl group, more preferably a C6-C26 alkenyl group.

A nonionic surfactant with a greater d (integer) has a higher value of HLB, which shows hydrophile-lipophile balance, and tends to migrate faster to the rubber surface. In the present invention, the d value is not particularly limited, and may be appropriately chosen according to the service conditions, purpose, or the like. In particular, the d value is preferably 2 to 25, more preferably 4 to 20, still more preferably 8 to 16, particularly preferably 10 to 14.

Examples of the nonionic surfactant represented by Formula (1) include ethylene glycol monooleate, ethylene glycol monopalmeate, ethylene glycol monopalmitate, ethylene glycol monovaccenate, ethylene glycol monolinoleate, ethylene glycol monolinolenate, ethylene glycol monoarachidonate, ethylene glycol monostearate, ethylene glycol monocetylate, and ethylene glycol monolaurate. Each of these may be used alone, or two or more of these may be used in combination. In view of ready availability and cost, ethylene glycol monooleate, ethylene glycol monolaurate, ethylene glycol monostearate, and ethylene glycol monopalmitate are preferred among these.

$R^2$ and $R^3$ in Formula (2) are the same or different and each represent a C6-C26 hydrocarbon group. If $R^2$ or $R^3$ is a hydrocarbon group having 5 or less carbon atoms, such a nonionic surfactant poorly permeates through rubber and migrates to the rubber surface too fast, as a result of which the rubber surface tends to have poor appearance. If $R^2$ or $R^3$ is a hydrocarbon group having 27 or more carbon atoms, such a material is difficult to obtain or expensive and is thus inappropriate. When $R^2$ and $R^3$ are each a hydrocarbon group having a carbon number within the above range, blooming of the nonionic surfactant can be suitably controlled and the effects of the present invention can be more suitably achieved.

$R^2$ and $R^3$ are each preferably a hydrocarbon group having 8 to 24 carbon atoms, more preferably 10 to 22 carbon atoms, still more preferably 14 to 20 carbon atoms.

Examples of the C6-C26 hydrocarbon group as $R^2$ or $R^3$ include C6-C26 alkenyl groups, C6-C26 alkynyl groups, and C6-C26 alkyl groups.

Examples of the C6-C26 alkenyl groups, C6-C26 alkynyl groups, and C6-C26 alkyl groups include those groups mentioned for $R^1$ above.

$R^2$ and $R^3$ are each preferably a C6-C26 alkenyl group or a C6-C26 alkynyl group, more preferably a C6-C26 alkenyl group.

A nonionic surfactant with a greater e (integer) has a higher value of HLB, which shows hydrophile-lipophile balance, and tends to migrate faster to the rubber surface. In the present invention, the e value is not particularly limited, and may be appropriately chosen according to the service conditions, purpose, or the like. In particular, the e value is preferably 2 to 25, more preferably 4 to 20, still more preferably 8 to 16, particularly preferably 10 to 14.

Examples of the nonionic surfactant represented by Formula (2) include ethylene glycol dioleate, ethylene glycol dipalmeate, ethylene glycol dipalmitate, ethylene glycol divaccenate, ethylene glycol dilinoleate, ethylene glycol dilinolenate, ethylene glycol diarachidonate, ethylene glycol distearate, ethylene glycol dicetylate, and ethylene glycol dilaurate. Each of these may be used alone, or two or more of these may be used in combination. In view of ready availability and cost, ethylene glycol dioleate, ethylene glycol dilaurate, ethylene glycol distearate, and ethylene glycol dipalmitate are preferred among these.

The Pluronic-type nonionic surfactant will be described below.

The Pluronic-type nonionic surfactant is also called polyoxyethylene polyoxypropylene glycol, polyoxyethylene polyoxypropylene block polymer, or polypropylene glycol ethylene oxide adduct, and is generally a nonionic surfactant represented by Formula (I) below. As shown in Formula (I), the Pluronic-type nonionic surfactant contains on both sides thereof a hydrophilic group having an ethylene oxide structure, and also contains a hydrophobic group having a propylene oxide structure between the hydrophilic groups.

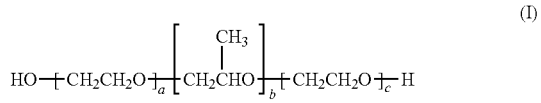
(I)

In Formula (I), a, b, and c each represent an integer.

The degree of polymerization of the polypropylene oxide block (b in Formula (I)) and the number of polyethylene oxide units added (a+c in Formula (I)) in the Pluronic-type nonionic surfactant are not particularly limited, and may be appropriately chosen according to the service conditions, purpose, or the like. A surfactant with a higher proportion of the polypropylene oxide block tends to have higher affinity for rubber and thus to migrate to the rubber surface at a slower rate. In particular, in order to suitably control blooming of the nonionic surfactant and more suitably achieve the effects of the present invention, the degree of polymerization of the polypropylene oxide block (b in Formula (I)) is preferably 100 or less, more preferably 10 to 70, still more preferably 10 to 60, particularly preferably 20 to 60, most preferably 20 to 45. For the same reason, the number of polyethylene oxide units added (a+c in Formula (I)) is preferably 100 or less, more preferably 3 to 65, still more preferably 5 to 55, particularly preferably 5 to 40, most preferably 10 to 40. When the degree of polymerization of the polypropylene oxide block and the number of polyethylene oxide units added are within the respective ranges described above, blooming of the nonionic surfactant can be suitably controlled and the effects of the present invention can be more suitably achieved.

Examples of the Pluronic-type nonionic surfactant include Pluronic series available from BASF Japan Ltd., Newpol PE series available from Sanyo Chemical Industries, Ltd., Adeka Pluronic L or F series available from Adeka Corporation, Epan series available from DKS Co. Ltd., and Pronon series or UNILUB available from NOF corporation. Each of these may be used alone, or two or more of these may be used in combination.

The combined amount of the nonionic surfactant represented by Formula (1), the nonionic surfactant represented by Formula (2), and the Pluronic-type nonionic surfactant (the amount of the nonionic surfactants), per 100 parts by mass of the rubber component is 0.1 parts by mass or more, preferably 0.3 parts by mass or more, more preferably 0.5 parts by mass or more, still more preferably 1 part by mass or more, particularly preferably 1.2 parts by mass or more. If the combined amount is less than 0.1 parts by mass, the effects of the present invention cannot be sufficiently obtained. Also, the combined amount is 5.0 parts by mass or less, preferably 4.0 parts by mass or less, more preferably 3.0 parts by mass or less, still more preferably 2.0 parts by mass or less. If the combined amount is more than 5.0 parts by mass, elongation at break and fuel economy are deteriorated.

A phenylenediamine antioxidant is used in the present invention. The use of such a specific antioxidant together with the specific surfactant(s) and optionally a petroleum-derived wax can provide excellent ozone resistance over a wide temperature range and also sufficiently suppress discoloration. The antioxidant may be used alone or in combinations of two or more.

Examples of the phenylenediamine antioxidant include N-(1,3-dimethylbutyl)-N'-phenyl-p-phenylenediamine, N-(1,4-dimethylpentyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diaryl-p-phenylenediamine, phenylhexyl-p-phenylenediamine, and phenyloctyl-p-phenylenediamine. Preferred among these is N-(1,3-dimethylbutyl)-N'-phenyl-p-phenylenediamine.

A quinone antioxidant may be used together with the phenylenediamine antioxidant. Examples of the quinone antioxidant include benzoquinone antioxidants, hydroquinone antioxidants, catechol antioxidants, quinonediimine antioxidants, quinomethane antioxidants, and quinodimethane antioxidants. Preferred among these are quinonediimine antioxidants.

Examples of the quinonediimine antioxidants include N-isopropyl-N'-phenyl-p-quinonediimine, N-(1,3-dimethylbutyl)-N'-phenylquinonediimine, N,N'-diphenyl-p-quinonediimine, N-cyclohexyl-N'-phenyl-p-quinonediimine, N-n-hexyl-N'-phenyl-p-quinonediimine, and N,N'-dioctyl-p-quinonediimine. Preferred among these is N-(1,3-dimethylbutyl)-N'-phenylquinonediimine (6QDI).

The amount of phenylenediamine antioxidant per 100 parts by mass of the rubber component is 1.0 part by mass or more, preferably 1.5 parts by mass or more, more preferably 1.8 parts by mass or more. If the amount is less than 1.0 part by mass, sufficient ozone resistance or elongation at break is not obtained. Also, the amount is 8.0 parts by mass or less, preferably 5.0 parts by mass or less, more preferably 4.5 parts by mass or less. If the amount is more than 8.0 parts by mass, fuel economy is deteriorated and discoloration (brown discoloration) occurs.

In the rubber composition of the present invention, the combined amount of carbon black and silica per 100 parts by mass of the rubber component is 20 to 45 parts by mass, preferably 24 to 43 parts by mass, more preferably 27 to 40 parts by mass. If the combined amount is less than 20 parts by mass, elongation at break, ozone resistance, or discoloration resistance is reduced, while if the combined amount is more than 45 parts by mass, fuel economy or ozone resistance, particularly fuel economy, is deteriorated. Moreover, if an increased amount of oil is used to ensure better crack growth resistance, the antioxidant and wax bloom faster so that long-term ozone resistance tends to be reduced. Moreover, when the combined amount of carbon black and silica is within the above range, elongation at break is markedly reduced by the addition of the aforementioned surfactant. In contrast, in the present invention using a high viscosity polybutadiene rubber such as the specific non-oil extended polybutadiene rubber or the specific oil extended polybutadiene rubber together with the specific surfactant, both discoloration resistance and ozone resistance can be ensured while maintaining or improving good elongation at break and good fuel economy.

In the present invention, either carbon black or silica may be used alone, or both may be used in combination.

The rubber composition of the present invention preferably contains carbon black. The addition of carbon black produces a reinforcing effect and an UV-blocking effect and therefore the effects of the present invention can be well achieved. Examples of usable carbon black include GPF, FEF, HAF, ISAF, and SAF.

The carbon black preferably has a nitrogen adsorption specific surface area ($N_2SA$) of 20 to 200 $m^2/g$, more preferably 30 to 60 $m^2/g$. If the $N_2SA$ is less than 20 $m^2/g$, durability or handling stability may be reduced. If the $N_2SA$ is more than 200 $m^2/g$, sufficient fuel economy or processability may not be obtained. Herein, the nitrogen adsorption specific surface area of carbon black can be determined in conformity with JIS K 6217-2:2001.

In the case of the rubber composition containing carbon black, the amount of carbon black per 100 parts by mass of the rubber component is preferably 2 to 45 parts by mass, more preferably 20 to 43 parts by mass, still more preferably 24 to 40 parts by mass. If the amount is less than 2 parts by mass, sufficient reinforcing properties tend not to be obtained and durability, elongation at break, handling stability, ozone resistance, or discoloration resistance tends to be deteriorated. If the amount is more than 45 parts by mass, fuel economy or ozone resistance may be deteriorated.

The rubber composition of the present invention may contain silica. Any silica may be used, and examples include dry silica (anhydrous silica) and wet silica (hydrous silica). Wet silica (hydrous silica) is preferred because it has many silanol groups.

In the case of the rubber composition containing silica, the amount of silica may be appropriately chosen in view of the effects of the present invention and the like. For example, for use in sidewalls or clinches, the amount of silica is preferably 0.1 to 40 parts by mass per 100 parts by mass of the rubber component. If the amount is more than 40 parts by mass, fuel economy may be deteriorated.

In the case of the rubber composition containing silica, the rubber composition preferably contains a silane coupling agent together with silica. However, if the amount of carbon black is 15 parts by mass or more and the amount of silica is 12 parts by mass or less, it is unnecessary to add a silane coupling agent because in this case the silica is immobilized in the carbon gel and is thus unlikely to reaggregate.

Any silane coupling agent conventionally used in combination with silica in the rubber industry may be used. Examples include sulfide silane coupling agents such as bis(3-triethoxysilylpropyl)disulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane.

The rubber composition of the present invention may contain a naturally occurring wax containing 40 to 98% by mass of an ester component. The naturally occurring wax captures the antioxidant to inhibit the antioxidant from migrating to the tire surface. Accordingly, blooming of the antioxidant moderately slows down so that the antioxidant remains in the rubber composition for a long period of time. Thus, excellent ozone resistance can be ensured over a wide temperature range. Moreover, the antioxidant can be prevented from excessively blooming in a short period of time and therefore white discoloration and brown discoloration of the tire surface can also be prevented.

The amount (content) of the ester component based on 100% by mass of the naturally occurring wax is preferably 50 to 98% by mass, more preferably 60 to 98% by mass. A wax containing more than 98% by mass of the ester component tends to have reduced flexibility and thus to form a more fragile thin film.

The amount of free alcohol or free fatty acid based on 100% by mass of the naturally occurring wax is independently preferably 10% by mass or less, more preferably 7% by mass or less. If the amount is more than 10% by mass, ozone resistance, particularly at low temperatures, tends to be deteriorated.

Regarding the carbon number distribution (molecular weight distribution), i.e., the softening point distribution, of the naturally occurring wax, the naturally occurring wax preferably contains a component having a softening point of 40° C. to 95° C., more preferably 60° C. to 90° C., still more preferably 70° C. to 86° C. In such case, both discoloration resistance and ozone resistance can be ensured.

The softening point distribution of the wax can be determined, for example, by gas chromatography (GC) or by measuring heat flow (mW/g) at a rate of temperature rise of 5° C./min from −30° C. to 100° C. using a differential scanning calorimeter (DSC). When DSC is used, the presence of a component having a predetermined softening point in the wax can be determined based on whether or not the curve of heat flow versus temperature at the predetermined temperature point is below the baseline toward the endothermic side.

The naturally occurring wax (natural wax) may be a wax obtained by removing free fatty acids, free alcohols, resins, or the like from a naturally occurring wax. Suitable examples include refined naturally occurring waxes (refined natural waxes) such as refined gramineous plant waxes extracted from gramineous plants, e.g., refined rice wax, refined candelilla wax, refined beeswax, refined sugar cane wax, and the like. The use of such a refined naturally occurring wax, which contains reduced amounts of polar components, such as free fatty acids, free alcohols or resins, and has an increased relative proportion of hydrocarbons, not only improves the compatibility with low polarity rubber and the uniformity of the resulting film but also suppresses blooming. Therefore, brown discoloration of the rubber surface can be prevented.

The refined naturally occurring wax may be, for example, a wax obtained by removing at least one selected from the group consisting of free fatty acids, free alcohols, and resins from a naturally occurring wax. The naturally occurring wax may be any wax other than petroleum-derived waxes. Examples include plant waxes such as waxes extracted from gramineous plants, e.g., rice wax, candelilla wax, carnauba wax, Japan wax, and jojoba wax; animal waxes such as beeswax, lanolin, and spermaceti; mineral waxes such as ozokerite, ceresin, and petrolatum; hydrogenated natural fats and oils such as hydrogenated castor oil, hydrogenated soybean oil, hydrogenated rapeseed oil, and hydrogenated beef tallow; and refined products of the foregoing. Moreover, the naturally occurring wax may be derived from a genetically modified plant or animal. The removal may be carried out by any method that can remove free alcohols, free fatty acids, or resins, and known methods may be used.

The naturally occurring wax is preferably a refined plant wax, more preferably a refined wax extracted from a gramineous plant, particularly preferably refined rice wax. Moreover, the use of refined rice wax in combination with a petroleum-derived wax can suppress formation of cracks and provide excellent ozone resistance over a wide temperature range from low to high temperatures, and at the same time can sufficiently prevent brown discoloration and white discoloration. Furthermore, although the film may be broken by dynamic stimuli imposed during service of the tire, refined rice wax, which is a fatty acid ester and can be readily mixed with petroleum-derived waxes, antioxidants, and surfactants, can be expected to prevent crack formation and discoloration for a long period of time. The naturally occurring wax may be used alone or in combinations of two or more.

The amount of the naturally occurring wax per 100 parts by mass of the rubber component is preferably 0.01 parts by mass or more, more preferably 0.05 parts by mass or more, still more preferably 0.10 parts by mass or more. If the amount is less than 0.01 parts by mass, a particular effect such as improved ozone resistance may not be found. Also, the amount is preferably 5.0 parts by mass or less, more preferably 2.5 parts by mass or less, still more preferably 1.5 parts by mass or less, particularly preferably 0.5 parts by mass or less. If the amount is more than 5.0 parts by mass, the amount of blooms of the antioxidant decreases and thus ozone resistance and elongation at break are reduced.

A petroleum-derived wax is preferably added in the present invention. The petroleum-derived wax may be any of waxes derived from petroleum resources, including, for example, paraffin wax and microcrystalline wax. In particular, for excellent ozone resistance over a wide temperature range, the petroleum-derived wax preferably contains C20 to C32 normal alkanes. The petroleum-derived wax may be used alone or in combinations of two or more.

The petroleum-derived wax containing C20 to C32 normal alkanes is not particularly limited, and may be, for example, a petroleum-derived wax containing a predetermined amount of C20 to C55 normal alkanes. In particular, for excellent ozone resistance, the petroleum-derived wax may suitably be a wax having a normal alkane content of 70% by mass or more, more suitably 80% by mass or more.

The combined amount of C20 to C32 normal alkanes based on 100% by mass of the petroleum-derived wax is preferably 25% by mass or more, more preferably 35% by mass or more. If the combined amount is less than 25% by mass, sufficient ozone resistance may not be obtained at a temperature range of 20° C. or lower. The combined amount is preferably 90% by mass or less, more preferably 50% by mass or less. If the combined amount is more than 90% by mass, discoloration resistance may be reduced.

The combined amount of C33 to C44 normal alkanes based on 100% by mass of the petroleum-derived wax is preferably 25% by mass or more, more preferably 35% by mass or more. If the combined amount is less than 25% by mass, sufficient ozone resistance may not be obtained at a temperature range from about 40° C. to about 50° C. The combined amount is preferably 90% by mass or less, more preferably 50% by mass or less. If the combined amount is more than 90% by mass, a large amount of C33 to C44 normal alkanes tend to bloom at a temperature range from about 40° C. to about 50° C., causing white discoloration.

The combined amount of C45 to C47 normal alkanes based on 100% by mass of the petroleum-derived wax is preferably 0.5% by mass or more, more preferably 2% by mass or more. If the combined amount is less than 0.5% by mass, crack resistance may be slightly deteriorated at a temperature range of about 60° C. The combined amount is preferably 10% by mass or less, more preferably 5% by mass or less. If the combined amount is more than 10% by mass, resistance to discoloration (white discoloration) tends to be deteriorated at a temperature range of about 60° C.

The combined amount of C48 and higher normal alkanes based on 100% by mass of the petroleum-derived wax is preferably 10% by mass or less, more preferably 5% by mass or less. In such case, good resistance to discoloration (white discoloration) can be achieved at a temperature range of 60° C. or higher.

In the case of the rubber composition containing a petroleum-derived wax, the amount of petroleum-derived wax per 100 parts by mass of the rubber component is preferably 0.3 parts by mass or more, more preferably 1.0 part by mass or more. If the amount is less than 0.3 parts by mass, a particular effect such as improved ozone resistance may not be found. Also, the amount is preferably 6.0 parts by mass or less, more preferably 4.0 parts by mass or less, still more preferably 2.0 parts by mass or less. If the amount is more than 6.0 parts by mass, too large an amount of blooms is formed, which may cause white discoloration of the tire and reduce elongation at break or fuel economy.

In the present invention, the blending ratio of the naturally occurring wax and the petroleum-derived wax [(mass of naturally occurring wax)/(mass of petroleum-derived wax)] is preferably 2/98 to 70/30, more preferably 5/95 to 50/50, still more preferably 10/90 to 40/60. In such case, both ozone resistance and discoloration resistance can be more suitably ensured.

The rubber composition of the present invention may contain a softener. When a softener is added, blooming of the above-mentioned antioxidant, naturally occurring wax, nonionic surfactant, and petroleum-derived wax can be suitably controlled and the effects of the present invention can be better achieved.

Examples of the softener include oil, and resins such as C5 petroleum resin, C9 petroleum resin, coumarone indene resin, indene resin, non-reactive alkylphenol resins, or aromatic vinyl polymers obtained by polymerizing α-methyl-styrene and/or styrene. The softener may be appropriately selected depending on the migration rate of the wax or antioxidant, and the like. Among these, oil is preferred because the effects of the present invention can be suitably achieved.

Examples of the oil include process oils, vegetable fats and oils, and mixtures of these. Examples of the process oils include paraffinic process oils, aromatic process oils, and naphthenic process oils. Specific examples of the paraffinic process oil include PW-32, PW-90, PW-150, and PS-32 available from Idemitsu Kosan Co., Ltd. Specific examples of the aromatic process oil include AC-12, AC-460, AH-16, AH-24, and AH-58 available from Idemitsu Kosan Co., Ltd. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice bran oil, safflower oil, sesame oil, olive oil, sunflower oil, palm kernel oil, camellia oil, jojoba oil, macadamia nut oil, and tung oil. Each of these may be used alone, or two or more of these may be used in combination. Among these, aromatic process oils are preferred because the effects of the present invention can be suitably achieved.

In the case of the rubber composition containing a softener, the amount of softener per 100 parts by mass of the rubber component is preferably 1.0 part by mass or more, more preferably 3.0 parts by mass or more. Also, the amount of softener is preferably 40 parts by mass or less, more preferably 30 parts by mass or less, still more preferably 14 parts by mass or less, particularly preferably 8.0 parts by mass or less. If the amount of softener, which itself blooms to the tire surface, is adjusted to the above range, blooming of the above-mentioned antioxidant, naturally occurring wax, nonionic surfactant, and petroleum-derived wax can be suitably controlled and the effects of the present invention can be more suitably achieved.

The rubber composition of the present invention may appropriately contain compounding agents commonly used in the manufacture of rubber compositions, such as stearic acid, zinc oxide, a vulcanizing agent, or a vulcanization accelerator, in addition to the above-mentioned components.

Sulfur is preferably used as a vulcanizing agent in the present invention. In this case, a moderate amount of crosslinks are formed between polymers, as a result of which blooming of the above-mentioned antioxidant, naturally occurring wax, nonionic surfactant, and petroleum-derived wax can be suitably controlled and the effects of the present invention can be more suitably achieved. Examples of the sulfur include those commonly used in the rubber industry, such as powdered sulfur, precipitated sulfur, colloidal sulfur, insoluble sulfur, highly dispersible sulfur, and soluble sulfur. Each of these may be used alone, or two or more of these may be used in combination.

The amount of sulfur per 100 parts by mass of the rubber component is preferably 0.1 parts by mass or more, more preferably 0.5 parts by mass or more, still more preferably 1.0 part by mass or more. If the amount is less than 0.1 parts by mass, insufficient hardness (Hs) after vulcanization may be obtained and co-curing with neighboring rubber compounds may be insufficient. The amount of sulfur is preferably 6.0 parts by mass or less, more preferably 5.0 parts by mass or less, still more preferably 4.0 parts by mass or less, particularly preferably 3.0 parts by mass or less. If the amount is more than 6.0 parts by mass, crack growth resistance, ozone resistance, elongation at break, or durability may be deteriorated.

Besides sulfur, an alkylphenol-sulfur chloride condensate (for example, Tackirol V200 available from Taoka Chemical Co., Ltd.) may be used as a vulcanizing agent in the present invention.

The rubber composition of the present invention may be prepared by known methods, such as, for example, by kneading the aforementioned components using a rubber kneading machine such as an open roll mill or a Banbury mixer, and then vulcanizing the mixture.

The rubber composition of the present invention can be used in any tire component and can be suitably used as a rubber composition for tire outer layers that forms a surface (outer face) of a tire, such as a tread, a wing, a sidewall, or a clinch, and more suitably a sidewall or a wing.

A wing refers to a component positioned between a tread and a sidewall in the shoulder area. Specifically, it is a component shown in FIGS. 1 and 3 of JP 2007-176267 A, or the like.

A clinch refers to a rubber part which is located at a lower portion of a sidewall and covers the area contacting a rim, and is also called a clinch apex or a rubber chafer. Specifically, it is a component shown in, for example, FIG. 1 of JP 2008-75066 A, or the like.

The pneumatic tire of the present invention can be manufactured using the rubber composition by usual methods. Specifically, the rubber composition, before vulcanization, is extruded and processed into the shape of a tire component such as a tread, a wing, a sidewall, or a clinch, and then assembled with other tire components in a conventional manner on a tire building machine to build an unvulcanized tire, which is then heated and pressurized in a vulcanizer to form a tire.

EXAMPLES

The present invention is specifically described with reference to, but not limited to, examples.

<Preparation of Terminal Modifier>

An amount of 20.8 g of 3-(N,N-dimethylamino)-propyl-trimethoxysilane (AZmax. Co) was put in a 250-mL graduated flask in a nitrogen atmosphere, and then anhydrous hexane (Kanto Chemical Co., Inc.) was added to a total volume of 250 mL.

Preparation Example

To a sufficiently nitrogen-purged 30-L pressure-proof vessel were added 18 L of cyclohexane (Kanto Chemical Co., Inc.), 2000 g of butadiene (Takachiho Chemical Industrial Co., Ltd.), and 53 mmol of diethyl ether (Kanto Chemical Co., Inc.), followed by heating to 60° C. Next, 16.6 mL of butyllithium (Kanto Chemical Co., Inc.) was added and stirred for 3 hours. Subsequently, 12 mL of a 0.4 mol/L solution of silicon tetrachloride in hexane was added and stirred for 30 minutes. Thereafter, 13 mL of the terminal modifier was added and stirred for 30 minutes. To the reaction solution was added 2 mL of a solution of 0.2 g of 2,6-tert-butyl-p-cresol (Ouchi Shinko Chemical Industrial Co., Ltd.) in methanol (Kanto Chemical Co., Inc.). The resulting reaction solution was put in a stainless steel vessel containing 18 L of methanol to collect an aggregate. The aggregate was dried for 24 hours under reduced pressure to give a modified BR.

The chemicals used in the examples and comparative examples are collectively listed below.

NR: TSR20

IR: IR2200

BR 1: BR1250H (tin-modified BR polymerized using a lithium initiator, tin atom content: 250 ppm) available from Zeon Corporation BR 2: VCR617 (SPB-containing BR, SPB content: 17% by mass, melting point of SPB: 200° C.) available from Ube Industries, Ltd.

BR 3: VCR412 (SPB-containing BR, SPB content: 12% by mass, melting point of SPB: 200° C.) available from Ube Industries, Ltd.

BR 4: BUNA-CB22 (rare earth-catalyzed BR synthesized using a Nd catalyst) available from LANXESS BR 5: BUNA-CB24 (rare earth-catalyzed BR synthesized using a Nd catalyst) available from LANXESS BR 6: BR730 (rare earth-catalyzed BR synthesized using a Nd catalyst) available from JSR Corporation BR 7: BR150B (BR synthesized using a Co catalyst) available from Ube Industries, Ltd.

BR 8: modified BR prepared in the above Preparation Example (modified BR synthesized using a lithium catalyst)

BR 9: BUNA-CB29 TDAE (rare earth-catalyzed BR synthesized using a Nd catalyst, containing 37.5 parts by mass of TDAE per 100 parts by mass of the rubber component) available from LANXESS BR10: BUNA-CB29 MES (rare earth-catalyzed BR synthesized using a Nd catalyst, containing 37.5 parts by mass of MES per 100 parts by mass of the rubber component) available from LANXESS SBR: SBR1502 available from Zeon Corporation Carbon black 1 (N550): Shoblack N550 ($N_2SA$: 42 $m^2/g$, DBP oil absorption: 115 mL/100 g) available from Cabot Japan K. K.

Carbon black 2 (N220): Shoblack N220 ($N_2SA$: 111 $m^2/g$, DBP oil absorption: 115 mL/100 g) available from Cabot Japan K. K.

Silica: Ultrasil VN3 available from Evonik Degussa

Oil: Vivatec 500 (TDAE, low polycyclic aroma oil) available from H&R

Petroleum C5 resin: Marukarez T-100AS (softening point: 102° C.) available from Maruzen Petrochemical Co., Ltd.

Stearic acid: Stearic acid "Tsubaki" available from NOF Corporation

Zinc oxide: Ginrei R available from Toho Zinc Co., Ltd.

Sulfur: SEIMI sulfur OT (insoluble sulfur, oil content: 10%) available from Nippon Kanryu Industry Co., Ltd.

Vulcanization accelerator TBBS: Nocceler NS (N-tert-butyl-2-benzothiazolylsulfenamide) available from Ouchi Shinko Chemical Industrial Co., Ltd.

Petroleum-derived wax: Trial product (normal alkane content: 85% by mass on average)

Naturally occurring wax: Refined rice wax S-100 (softening point distribution: 77° C. to 83° C., ester component: 95% by mass, free fatty acid: 4% by mass, free alcohol: 1% by mass, hydrocarbon: 1% by mass) available from Yokozeki Oil & Fat Industries Co., Ltd.

<Surfactant 1>: Ionet DO600 (the principal ingredient is a compound represented by the formula below which corresponds to Formula (2) in which $R^2$ and $R^3$ are each —$C_{17}H_{33}$ and e is 12) available from Sanyo Chemical Industries, Ltd.

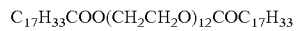

$C_{17}H_{33}COO(CH_2CH_2O)_{12}COC_{17}H_{33}$

<Surfactant 2>: Ionet PO600 (the principal ingredient is a compound represented by the formula below which corresponds to Formula (1) in which $R^1$ is —$C_{17}H_{33}$ and d is 12) available from Sanyo Chemical Industries, Ltd.

$C_{17}H_{33}COO(CH_2CH_2O)_{12}H$

<Surfactant 3>: NEWPOL PE-64 (Pluronic-type nonionic surfactant, copolymer of PEG/PPG (25/30), Formula (I) in which a+c is 25 and b is 30) available from Sanyo Chemical Industries, Ltd.

<Surfactant 4>: NEWPOL PE-74 (Pluronic-type nonionic surfactant, copolymer of PEG/PPG (30/35), Formula (I) in which a+c is 30 and b is 35) available from Sanyo Chemical Industries, Ltd.

<Surfactant 5>: Polyoxyethylene sorbitan monostearate available from Kanto Chemical Co., Inc.

<Surfactant 6>: Polyoxyethylene sorbitan trioleate available from Kanto Chemical Co., Inc.

<Surfactant 7>: Polyoxyethylene dodecyl ether available from Kanto Chemical Co., Inc.

<Surfactant 8>: Ethylene glycol dibutyl ether available from Tokyo Chemical Industry Co., Ltd.

Antioxidant 6C: Antigene 6C (N-(1,3-dimethylbutyl)-N'-phenyl-p-phenylenediamine (6PPD)) available from Sumitomo Chemical Co., Ltd.

Antioxidant TMQ: Nocrac 224 (2,2,4-trimethyl-1,2-dihydroquinoline polymer) available from Ouchi Shinko Chemical Industrial Co., Ltd.

The properties of BR 1 to BR 10 are summarized in Table 1. BR 2, BR 4, and BR 6 correspond to the non-oil extended polybutadiene rubber, and BR 9 and BR 10 correspond to the oil extended polybutadiene rubber.

TABLE 1

|  | Trade name, etc. | Catalyst | Oil extended/ Non-oil extended | GPC analysis | | Mw ($\times 10^4$) | SPB content (% by mass) | $ML_{1+4}$ 100° C. | Microstructure (% by mass) | |
|---|---|---|---|---|---|---|---|---|---|---|
|  |  |  |  | Mw/Mn | Mn ($\times 10^4$) |  |  |  | Cis content | Vinyl content |
| BR 1 | BR1250H | Lithium catalyst | Non-oil extended BR | 1.39 | 33 | 46 | — | 51 | 40 | 10.0 |
| BR 2 | VCR617 | Cobalt catalyst | Non-oil extended BR | 2.5 | 17 | 44 | 17 | 62 | 96 | 2.2 |
| BR 3 | VCR412 | Cobalt catalyst | Non-oil extended BR | 2.6 | 17 | 43 | 12 | 45 | 96 | 2.2 |
| BR 4 | CB22 | Neodymium catalyst | Non-oil extended BR | 1.6 | 37 | 59 | — | 63 | 97 | 0.6 |

TABLE 1-continued

|  | Trade name, etc. | Catalyst | Oil extended/Non-oil extended | GPC analysis | | | SPB | $ML_{1+4}$ 100° C. | Microstructure (% by mass) | |
|  |  |  |  | Mw/Mn | Mn (×10⁴) | Mw (×10⁴) | content (% by mass) |  | Cis content | Vinyl content |
|---|---|---|---|---|---|---|---|---|---|---|
| BR 5 | CB24 | Neodymium catalyst | Non-oil extended BR | 1.78 | 28 | 50 | — | 44 | 97 | 0.7 |
| BR 6 | BR730 | Neodymium catalyst | Non-oil extended BR | 1.88 | 31 | 58 | — | 51 | 97 | 0.9 |
| BR 7 | BR150B | Cobalt catalyst | Non-oil extended BR | 2.3 | 19 | 44 | — | 43 | 96 | 2.1 |
| BR 8 | Modified BR synthesized in Preparation Example | Lithium catalyst | Non-oil extended BR | 1.19 | 46 | 55 | — | 60 | 38 | 13 |
| BR 9 | CB29 TDAE, oil extended | Neodymium catalyst | Oil extended BR | 2.33 | 32.6 | 76 | — | 37 | 97 | 0.6 |
| BR 10 | CB29 MES, oil extended | Neodymium catalyst | Oil extended BR | 3.86 | 19.1 | 73.7 | — | 37 | 97 | 0.6 |

The carbon number distribution of the petroleum-derived wax was determined by the method below. Table 4 shows the results.

The carbon number distribution was measured using a capillary GC analyzer and a capillary column coated with aluminum with helium carrier gas at a flow rate of 4 mL/min, a column temperature of 180° C. to 390° C., and a rate of temperature rise of 15° C./min.

Examples and Comparative Examples

The chemicals in formulation amounts shown in Table 2 or 3, except the sulfur and vulcanization accelerator, were kneaded in a 1.7-L Banbury mixer available from Kobe Steel, Ltd. Then, the sulfur and vulcanization accelerator were added to the kneaded mixture and they were kneaded using an open roll mill to prepare an unvulcanized rubber composition. The unvulcanized rubber composition was formed into the shapes of a tread, a wing, a sidewall, and a clinch, and they were assembled with other tire components to build an unvulcanized tire, which was then vulcanized at 170° C. to prepare a test tire (205/65R15). The test tires thus prepared were evaluated for performance by the following tests.

<Hardness Measurement>

Rubber samples were cut out of the sidewalls of the tires. Next, the hardness of the rubber samples was measured at 25° C. using a durometer in conformity with JIS K 6253 (Shore A measurement). The compositions were adjusted to have a hardness of 54±1 in order to permit comparison of the elongation at break (EB) of the compositions.

<Elongation at Break>

Rubber samples were cut out of the sidewalls of the tires. Next, specimens were prepared from the rubber samples using a No. 3 dumbbell die, and then subjected to a tensile test at room temperature in conformity with JIS K 6251 "Rubber, vulcanized or thermoplastics—Determination of tensile stress-strain properties" to measure the elongation at break EB (%). The EB values were used to calculate an index [(EB of each formulation)/(EB of Comparative Example 1)×100], where the EB value of Comparative Example 1 was taken as 100. A higher index indicates better elongation at break. The target EB index was 95 or higher.

<Fuel Economy>

Rubber samples were cut out of the sidewalls of the tires. Then, the tan δ of the rubber samples of the formulations was measured using a viscoelastic spectrometer VES (Iwamoto Seisakusho) at a temperature of 70° C., an initial strain of 10%, and a dynamic strain of ±1%. Using the equation below, the tan δ values were expressed as an index relative to the tan δ of Comparative Example 1 (=100). A higher index indicates better rolling resistance properties (fuel economy). The target RR index was 90 or higher.

(Rolling resistance index)=(tan δ of Comparative Example 1)/(tan δ of each formulation)×100

<Ozone Cracking Resistance Test>

Road tests were conducted in the United Arab Emirates in the Middle East (a hot climate) for approximately a year (including summer), and in Hokkaido, Japan (a cold climate) for approximately a year (including winter). The degree of cracking in the test was evaluated based on the criteria below. A greater number indicates better ozone resistance (crack resistance). The target number was 3+ or higher.
(Criteria)
1: A crack or break of 3 mm or more was observed.
2: A deep crack of at least 1 mm but less than 3 mm was observed.
3: A deep and relatively large crack of less than 1 mm was observed.
4: A crack or break was barely visible to the naked eye.
5: A crack or break was not visible to the naked eye, but visible with a magnifier (×10).

<Discoloration Test>

(1) Outdoor: Evaluation of Brown Discoloration

The tires were left outside in the sun for 6 months (from winter to summer) at Kobe city. Then, a* and b* were measured using a colorimeter. Based on the values, the evaluation was made on a five-point scale according to the criteria below. A greater number indicates a lower degree of brown discoloration. The target number was 3+ or higher.
(Criteria)
1: −(a*+b*)×10≤−30
2: −30<−(a*+b*)×10≤−20
3: −20<−(a*+b*)×10≤−10
4: −10<−(a*+b*)×10≤0
5: −(a*+b*)×10>0

(2) Indoor: Evaluation of White Discoloration

The tires were left in an indoor warehouse for 6 months (from winter to summer) at Kobe city. Then, L* was measured using a colorimeter. Based on the values, the evaluation was made on a five-point scale according to the criteria below. A greater number indicates a lower degree of white discoloration. The target number was 3+ or higher.
(Criteria)
1: 100−L*≤60
2: 60<100−L*≤65
3: 65<100−L*≤70
4: 70<100−L*≤75
5: 100−L*>75

TABLE 2

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Formulation (parts by mass) | NR | 50 | 50 | 50 | 50 | 50 | 50 | 50 | 50 | 50 | 50 | 50 | 50 |
| | IR | — | — | — | — | — | — | — | — | — | — | — | — |
| | BR 1 | 25 | 25 | 25 | 25 | 25 | 25 | 25 | 25 | 25 | 25 | 25 | 25 |
| | BR 2 | 25 | 25 | 25 | 25 | 25 | 25 | 25 | 25 | 25 | 25 | 25 | 25 |
| | BR 3 | — | — | — | — | — | — | — | — | — | — | — | — |
| | BR 4 | — | — | — | — | — | — | — | — | — | — | — | — |
| | BR 5 | — | — | — | — | — | — | — | — | — | — | — | — |
| | BR 6 | — | — | — | — | — | — | — | — | — | — | — | — |
| | BR 7 | — | — | — | — | — | — | — | — | — | — | — | — |
| | BR 8 | — | — | — | — | — | — | — | — | — | — | — | — |
| | BR 9 | — | — | — | — | — | — | — | — | — | — | — | — |
| | BR 10 | — | — | — | — | — | — | — | — | — | — | — | — |
| | SBR | — | — | — | — | — | — | — | — | — | — | — | — |
| | Carbon black 1 (N550) | 37 | 37 | 37 | 37 | 37 | 37 | 37 | 37 | 37 | 37 | 37 | 37 |
| | Carbon black 2 (N220) | — | — | — | — | — | — | — | — | — | — | — | — |
| | Silica | — | — | — | — | — | — | — | — | — | — | — | — |
| | Oil | 7.0 | 5.5 | 3.5 | 5.5 | 5.5 | 5.5 | 5.5 | 5.5 | 6.0 | 3.0 | 5.5 | 5.0 |
| | Petroleum C5 resin | — | — | — | — | — | — | — | — | — | — | — | — |
| | Petroleum-derived wax | 1.5 | 1.5 | 1.5 | 1.5 | 1.5 | 1.5 | 1.5 | 1.5 | — | 5.5 | 1.3 | 1.3 |
| | Naturally occurring wax | — | — | — | — | — | — | — | — | — | — | 0.20 | 1.0 |
| | Surfactant 1 | 0.1 | 1.5 | 4.5 | — | — | — | 1.5 | 1.5 | 1.5 | 1.5 | 1.5 | 1.5 |
| | Surfactant 2 | — | — | — | 1.5 | — | — | — | — | — | — | — | — |
| | Surfactant 3 | — | — | — | — | 1.5 | — | — | — | — | — | — | — |
| | Surfactant 4 | — | — | — | — | — | 1.5 | — | — | — | — | — | — |
| | Surfactant 5 | — | — | — | — | — | — | — | — | — | — | — | — |
| | Surfactant 6 | — | — | — | — | — | — | — | — | — | — | — | — |
| | Surfactant 7 | — | — | — | — | — | — | — | — | — | — | — | — |
| | Surfactant 8 | — | — | — | — | — | — | — | — | — | — | — | — |
| | Antioxidant 6C | 3.0 | 3.0 | 3.0 | 3.0 | 3.0 | 3.0 | 1.0 | 7.0 | 3.0 | 3.0 | 3.5 | 4.0 |
| | Antioxidant TMQ | 1.0 | 1.0 | 1.0 | 1.0 | 1.0 | 1.0 | — | 1.0 | 1.0 | 1.0 | 1.0 | 1.0 |
| | Stearic acid | 1.5 | 1.5 | 1.5 | 1.5 | 1.5 | 1.5 | 1.5 | 1.5 | 1.5 | 1.5 | 1.5 | 1.5 |
| | Sulfur | 2.0 | 2.0 | 2.0 | 2.0 | 2.0 | 2.0 | 2.0 | 2.0 | 2.0 | 2.0 | 2.0 | 5.0 |
| | Vulcanization accelerator TBBS | 0.75 | 0.75 | 0.75 | 0.75 | 0.75 | 0.75 | 0.75 | 0.75 | 0.75 | 0.75 | 0.75 | 0.75 |
| | Zinc oxide | 4.0 | 4.0 | 4.0 | 4.0 | 4.0 | 4.0 | 4.0 | 4.0 | 4.0 | 4.0 | 4.0 | 4.0 |
| Evaluation result | Hardness (Hs, adjusted to 54 ± 1) | — | — | — | — | — | — | — | — | — | — | — | — |
| | EB index (Target ≥95) | 101 | 100 | 95 | 101 | 100 | 100 | 97 | 104 | 105 | 95 | 100 | 96 |
| | RR index = tan δ (Target ≥90) | 100 | 100 | 92 | 99 | 99 | 99 | 103 | 96 | 102 | 92 | 99 | 98 |
| | Ozone resistance in hot climate (on a 5-point scale, Target ≥3+) | 3+ | 4 | 4 | 4 | 4 | 4 | 3+ | 5 | 3+ | 5 | 4+ | 4+ |
| | Ozone resistance in cold climate (on a 5-point scale, Target ≥3+) | 3+ | 4 | 4 | 4 | 4 | 4 | 3+ | 5 | 3+ | 5 | 4 | 4 |
| | Brown discoloration at Kobe city (on a 5-point scale, Target ≥3+) | 4 | 4+ | 5 | 4+ | 4+ | 4+ | 5 | 4+ | 5 | 3+ | 4 | 4+ |
| | White discoloration at Kobe city (on a 5-point scale, Target ≥3+) | 3+ | 4+ | 5 | 4+ | 4+ | 4+ | 5 | 4+ | 5 | 3+ | 4 | 5 |

| | | Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Formulation (parts by mass) | NR | 50 | 40 | 35 | 40 | 50 | 30 | — | 50 | 50 | 50 | 50 | 50 |
| | IR | — | 10 | — | 10 | — | 20 | 35 | — | — | — | — | — |
| | BR 1 | 25 | — | — | 25 | 25 | 35 | — | 25 | 25 | 25 | — | 25 |
| | BR 2 | 25 | — | — | — | 25 | — | — | — | — | 17 | 10 | — |
| | BR 3 | — | — | — | — | — | — | — | — | — | — | — | — |
| | BR 4 | — | 50 | — | 25 | — | 15 | 65 | 25 | — | — | — | — |
| | BR 5 | — | — | — | — | — | — | — | — | — | — | — | — |
| | BR 6 | — | — | 65 | — | — | — | — | — | — | — | — | — |
| | BR 7 | — | — | — | — | — | — | — | — | — | — | — | — |
| | BR 8 | — | — | — | — | — | — | — | — | — | — | — | — |
| | BR 9 | — | — | — | — | — | — | — | — | 34.4 | 11 | 55 | — |
| | BR 10 | — | — | — | — | — | — | — | — | — | — | — | 34.4 |
| | SBR | — | — | — | — | — | — | — | — | — | — | — | — |

TABLE 2-continued

|  |  |  |  |  |  |  |  |  |  |  |  |  |
|---|---|---|---|---|---|---|---|---|---|---|---|---|
|  | Carbon black 1 (N550) | 37 | 30 | 32 | 34 | 34 | 37 | 10 | 37 | 37 | 37 | 37 | 37 |
|  | Carbon black 2 (N220) | — | — | — | — | — | — | 9 | — | — | — | — | — |
|  | Silica | — | — | — | — | 5 | — | 5 | — | — | — | — | — |
|  | Oil | 4.0 | — | — | 6.0 | 6.0 | 5.5 | — | 8.0 | — | 5.0 | — | — |
|  | Petroleum C5 resin | — | 5.0 | 5.0 | — | — | — | 3.0 | — | — | — | — | — |
|  | Petroleum-derived wax | 1.3 | 1.5 | 1.5 | 1.5 | 1.3 | 1.5 | 1.5 | 1.5 | 1.5 | 1.5 | 1.5 | 1.5 |
|  | Naturally occurring wax | 2.0 | — | — | — | — | — | — | — | — | — | — | — |
|  | Surfactant 1 | 1.5 | 1.5 | 1.5 | 1.5 | 1.5 | 1.5 | 1.5 | 1.5 | 1.5 | 1.5 | 1.5 | 1.5 |
|  | Surfactant 2 | — | — | — | — | — | — | — | — | — | — | — | — |
|  | Surfactant 3 | — | — | — | — | — | — | — | — | — | — | — | — |
|  | Surfactant 4 | — | — | — | — | — | — | — | — | — | — | — | — |
|  | Surfactant 5 | — | — | — | — | — | — | — | — | — | — | — | — |
|  | Surfactant 6 | — | — | — | — | — | — | — | — | — | — | — | — |
|  | Surfactant 7 | — | — | — | — | — | — | — | — | — | — | — | — |
|  | Surfactant 8 | — | — | — | — | — | — | — | — | — | — | — | — |
|  | Antioxidant 6C | 4.0 | 4.0 | 4.0 | 3.0 | 3.0 | 3.0 | 4.0 | 3.0 | 3.0 | 3.0 | 3.0 | 3.0 |
|  | Antioxidant TMQ | 1.0 | 1.0 | 1.0 | 1.0 | 1.0 | 1.0 | 1.0 | 1.0 | 1.0 | 1.0 | 1.0 | 1.0 |
|  | Stearic acid | 1.5 | 1.5 | 1.5 | 1.5 | 1.5 | 1.5 | 1.5 | 1.5 | 1.5 | 1.5 | 1.5 | 1.5 |
|  | Sulfur | 2.0 | 2.0 | 2.0 | 2.0 | 2.0 | 2.0 | 2.0 | 2.0 | 2.0 | 2.0 | 2.0 | 2.0 |
|  | Vulcanization accelerator TBBS | 0.75 | 0.75 | 0.75 | 0.75 | 0.75 | 0.75 | 1.00 | 0.75 | 0.75 | 0.75 | 0.75 | 0.75 |
|  | Zinc oxide | 4.0 | 4.0 | 4.0 | 4.0 | 4.0 | 4.0 | 4.0 | 4.0 | 4.0 | 4.0 | 4.0 | 4.0 |
| Evaluation result | Hardness (Hs, adjusted to 54 ± 1) | — | — | — | — | — | — | — | — | — | — | — | — |
|  | EB index (Target ≥95) | 96 | 100 | 100 | 101 | 105 | 101 | 95 | 104 | 105 | 101 | 100 | 101 |
|  | RR index = tan δ (Target ≥90) | 95 | 102 | 95 | 104 | 106 | 105 | 109 | 102 | 102 | 100 | 97 | 106 |
|  | Ozone resistance in hot climate (on a 5-point scale, Target ≥3+) | 5 | 4 | 4 | 4 | 4 | 4 | 3+ | 4 | 4 | 4 | 3+ | 4 |
|  | Ozone resistance in cold climate (on a 5-point scale, Target ≥3+) | 4 | 4 | 4 | 4 | 4 | 4 | 4 | 4 | 4 | 4 | 4 | 4 |
|  | Brown discoloration at Kobe city (on a 5-point scale, Target ≥3+) | 5 | 4+ | 4+ | 4+ | 4+ | 4+ | 4 | 4+ | 4+ | 4+ | 3+ | 4+ |
|  | White discoloration at Kobe city (on a 5-point scale, Target ≥3+) | 5 | 4+ | 4+ | 4+ | 4 | 4+ | 4 | 4+ | 4+ | 4+ | 4 | 4+ |

TABLE 3

|  |  | Comparative Example |  |  |  |  |  |  |  |
|---|---|---|---|---|---|---|---|---|---|
|  |  | 1 | 2 | 3 | 4 | 5 | 6 | 7 | 8 |
| Formulation (parts by mass) | NR | 50 | 50 | 50 | 50 | 50 | 50 | 50 | 50 |
|  | IR | — | — | — | — | — | — | — | — |
|  | BR 1 | 25 | 25 | 25 | 25 | 25 | 25 | 25 | 25 |
|  | BR 2 | — | — | — | 25 | 25 | 25 | 25 | 25 |
|  | BR 3 | 25 | 25 | 25 | — | — | — | — | — |
|  | BR 4 | — | — | — | — | — | — | — | — |
|  | BR 5 | — | — | — | — | — | — | — | — |
|  | BR 6 | — | — | — | — | — | — | — | — |
|  | BR 7 | — | — | — | — | — | — | — | — |
|  | BR 8 | — | — | — | — | — | — | — | — |
|  | BR 9 | — | — | — | — | — | — | — | — |
|  | SBR | — | — | — | — | — | — | — | — |
|  | Carbon black 1 (N550) | 37 | 37 | 47 | 37 | 37 | 37 | 37 | 37 |
|  | Carbon black 2 (N220) | — | — | — | — | — | — | — | — |
|  | Silica | — | — | — | — | — | — | — | — |
|  | Oil | 7.0 | 5.5 | 12.0 | 5.5 | 5.5 | 5.5 | 5.5 | 2.0 |
|  | Petroleum C5 resin | — | — | — | — | — | — | — | — |
|  | Petroleum-derived wax | 1.5 | 1.5 | 1.5 | 1.5 | 1.5 | 1.5 | 1.5 | 1.5 |
|  | Naturally occurring wax | — | — | — | — | — | — | — | — |
|  | Surfactant 1 | — | 1.5 | 1.5 | — | — | — | — | 6.0 |
|  | Surfactant 2 | — | — | — | — | — | — | — | — |
|  | Surfactant 3 | — | — | — | — | — | — | — | — |
|  | Surfactant 4 | — | — | — | — | — | — | — | — |
|  | Surfactant 5 | — | — | — | — | 1.5 | — | — | — |

TABLE 3-continued

|  |  | | | | | | | | |
|---|---|---|---|---|---|---|---|---|---|
|  | Surfactant 6 | — | — | — | — | 1.5 | — | — | — |
|  | Surfactant 7 | — | — | — | — | — | 1.5 | — | — |
|  | Surfactant 8 | — | — | — | — | — | — | 1.5 | — |
|  | Antioxidant 6C | 3.0 | 3.0 | 3.0 | 3.0 | 3.0 | 3.0 | 3.0 | 3.0 |
|  | Antioxidant TMQ | 1.0 | 1.0 | 1.0 | 1.0 | 1.0 | 1.0 | 1.0 | 1.0 |
|  | Stearic acid | 1.5 | 1.5 | 1.5 | 1.5 | 1.5 | 1.5 | 1.5 | 1.5 |
|  | Sulfur | 2.0 | 2.0 | 2.0 | 2.0 | 2.0 | 2.0 | 2.0 | 2.0 |
|  | Vulcanization accelerator TBBS | 0.75 | 0.75 | 0.75 | 0.75 | 0.75 | 0.75 | 0.75 | 0.75 |
|  | Zinc oxide | 4.0 | 4.0 | 4.0 | 4.0 | 4.0 | 4.0 | 4.0 | 4.0 |
| Evaluation result | Hardness (Hs, adjusted to 54 ± 1) | — | — | — | — | — | — | — | — |
|  | EB index (Target ≥95) | 100 | 85 | 102 | 86 | 71 | 79 | 84 | 82 |
|  | RR index = tan δ (Target ≥90) | 100 | 95 | 82 | 92 | 84 | 86 | 93 | 85 |
|  | Ozone resistance in hot climate (on a 5-point scale, Target ≥3+) | 3 | 3+ | 2+ | 3 | 2+ | 2+ | 2+ | 4 |
|  | Ozone resistance in cold climate (on a 5-point scale, Target ≥3+) | 3 | 4 | 4 | 3 | 3+ | 3+ | 3+ | 4 |
|  | Brown discoloration at Kobe city (on a 5-point scale, Target ≥3+) | 3 | 4+ | 4 | 4+ | 4 | 4 | 4 | 5 |
|  | White discoloration at Kobe city (on a 5-point scale, Target ≥3+) | 3 | 4+ | 4 | 4 | 4 | 3+ | 4 | 5 |

|  |  | Comparative Example | | | | | | |
|---|---|---|---|---|---|---|---|---|
|  |  | 9 | 10 | 11 | 12 | 13 | 14 | 15 |
| Formulation (parts by mass) | NR | 50 | 50 | 50 | 50 | 50 | 20 | 50 |
|  | IR | — | — | — | — | — | 15 | — |
|  | BR 1 | 25 | 25 | — | — | — | — | 25 |
|  | BR 2 | 25 | 25 | — | — | — | — | 25 |
|  | BR 3 | — | — | — | — | — | — | — |
|  | BR 4 | — | — | — | — | — | 65 | — |
|  | BR 5 | — | — | 50 | — | — | — | — |
|  | BR 6 | — | — | — | — | — | — | — |
|  | BR 7 | — | — | — | 50 | — | — | — |
|  | BR 8 | — | — | — | — | 50 | — | — |
|  | BR 9 | — | — | — | — | — | — | — |
|  | SBR | — | — | — | — | — | — | — |
|  | Carbon black 1 (N550) | 37 | 37 | 39 | 39 | 39 | — | 47 |
|  | Carbon black 2 (N220) | — | — | — | — | — | 13 | — |
|  | Silica | — | — | — | — | — | 5 | — |
|  | Oil | 6.0 | 6.0 | — | — | — | — | 15.0 |
|  | Petroleum C5 resin | — | — | 5.0 | 5.0 | 5.0 | 3.0 | — |
|  | Petroleum-derived wax | 1.5 | 1.5 | 1.5 | 1.5 | 1.5 | 1.5 | 1.5 |
|  | Naturally occurring wax | — | — | — | — | — | — | — |
|  | Surfactant 1 | 1.5 | 1.5 | 1.5 | 1.5 | 1.5 | 1.5 | 1.5 |
|  | Surfactant 2 | — | — | — | — | — | — | — |
|  | Surfactant 3 | — | — | — | — | — | — | — |
|  | Surfactant 4 | — | — | — | — | — | — | — |
|  | Surfactant 5 | — | — | — | — | — | — | — |
|  | Surfactant 6 | — | — | — | — | — | — | — |
|  | Surfactant 7 | — | — | — | — | — | — | — |
|  | Surfactant 8 | — | — | — | — | — | — | — |
|  | Antioxidant 6C | 0.5 | 9.0 | 4.0 | 4.0 | 4.0 | 4.0 | 3.0 |
|  | Antioxidant TMQ | 1.0 | 1.0 | 1.0 | 1.0 | 1.0 | 1.0 | 1.0 |
|  | Stearic acid | 1.5 | 1.5 | 1.5 | 1.5 | 1.5 | 1.5 | 1.5 |
|  | Sulfur | 2.0 | 2.0 | 2.0 | 2.0 | 2.0 | 2.0 | 2.0 |
|  | Vulcanization accelerator TBBS | 0.75 | 0.75 | 0.75 | 0.75 | 0.75 | 1.20 | 0.75 |
|  | Zinc oxide | 4.0 | 4.0 | 4.0 | 4.0 | 4.0 | 4.0 | 4.0 |
| Evaluation result | Hardness (Hs, adjusted to 54 ± 1) | — | — | — | — | — | — | — |
|  | EB index (Target ≥95) | 92 | 107 | 96 | 85 | 72 | 70 | 100 |
|  | RR index = tan δ (Target ≥90) | 100 | 89 | 87 | 81 | 110 | 115 | 78 |
|  | Ozone resistance in hot climate (on a 5-point scale, Target ≥3+) | 2 | 5 | 4 | 4 | 4 | 3+ | 2+ |
|  | Ozone resistance in cold climate (on a 5-point scale, Target ≥3+) | 2 | 5 | 4 | 4 | 4 | 4 | 4 |
|  | Brown discoloration at Kobe city (on a 5-point scale, Target ≥3+) | 5 | 3 | 4+ | 4+ | 4+ | 4 | 4 |
|  | White discoloration at Kobe city (on a 5-point scale, Target ≥3+) | 5 | 3 | 4+ | 4+ | 3+ | 3+ | 4 |

TABLE 4

|  |  | Amount of normal alkane according to carbon number (in wax) Petroleum-derived wax (Trial product) |
|---|---|---|
| Carbon number of normal alkanes | 19 | 0.1 |
|  | 20 | 0.29 |
|  | 21 | 0.68 |
|  | 22 | 1.31 |
|  | 23 | 2.32 |
|  | 24 | 3.3 |
|  | 25 | 4.14 |
|  | 26 | 4.38 |
|  | 27 | 4.58 |
|  | 28 | 3.92 |
|  | 29 | 3.92 |
|  | 30 | 3.61 |

TABLE 4-continued

| | Amount of normal alkane according to carbon number (in wax) Petroleum-derived wax (Trial product) |
|---|---|
| 31 | 4.16 |
| 32 | 4.13 |
| 33 | 4.59 |
| 34 | 4.32 |
| 35 | 4.7 |
| 36 | 4.47 |
| 37 | 4.31 |
| 38 | 3.71 |
| 39 | 3.3 |
| 40 | 2.88 |
| 41 | 2.48 |
| 42 | 2.09 |
| 43 | 1.7 |
| 44 | 1.42 |
| 45 | 1.13 |
| 46 | 0.9 |
| 47 | 0.72 |
| 48 | 0.56 |
| 49 | 0.42 |
| 50 | 0.35 |
| 51 | 0.23 |
| 52 | 0.17 |
| 53 | 0.12 |
| 54 | 0.09 |
| 55 | 0.06 |
| Amount of C20 to C32 normal alkanes (% by mass) | 40.7 |
| Amount of C33 to C44 normal alkanes (% by mass) | 40.0 |
| Amount of C45 to C47 normal alkanes (% by mass) | 2.8 |
| Amount of C48 and higher normal alkanes (% by mass) | 2.0 |
| Amount of iso-components (% by mass) | 14.5 |

The rubber compositions of the examples containing: a rubber component including at least one selected from the group consisting of a specific non-oil extended polybutadiene rubber that has a cis content of 95% by mass or more and a Mooney viscosity ($ML_{1+4}$, 100° C.) of 50 or more and an oil extended polybutadiene rubber that has a cis content of 95% by mass or more and a weight average molecular weight (Mw) of 420,000 or higher, the rubber component including a predetermined amount of diene rubber; a predetermined amount of a phenylenediamine antioxidant; a predetermined amount of a specific nonionic surfactant; and a predetermined amount of carbon black and/or silica, prevented discoloration and improved ozone resistance while maintaining or improving good elongation at break and good fuel economy.

The invention claimed is:

1. A rubber composition for tires, comprising:
a rubber component comprising at least one selected from the group consisting of a non-oil extended polybutadiene rubber that has a cis content of 95% by mass or more and a Mooney viscosity ($ML_{1+4}$, 100° C.) of 50 or more and an oil extended polybutadiene rubber that has a cis content of 95% by mass or more and a weight average molecular weight (Mw) of 420,000 or higher, the non-oil extended polybutadiene rubber being at least one selected from the group consisting of a polybutadiene rubber synthesized using a rare earth catalyst and a polybutadiene rubber containing 1,2-syndiotactic polybutadiene crystals, the rubber composition having an amount of diene rubber of 70 to 100% by mass based on 100% by mass of the rubber component;
1.0 to 8.0 parts by mass, per 100 parts by mass of the rubber component, of a phenylenediamine antioxidant;
0.1 to 5.0 parts by mass, per 100 parts by mass of the rubber component, of a nonionic surfactant, the nonionic surfactant being at least one selected from the group consisting of polyoxyethylene polyoxypropylene glycols, polyoxyethylene polyoxypropylene block polymers, and polypropylene glycol ethylene oxide adducts, and at least one of nonionic surfactants represented by Formula (1) or Formula (2) below,

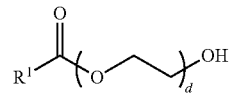
(1)

wherein $R^1$ represents a C6-C26 hydrocarbon group, and d represents an integer,

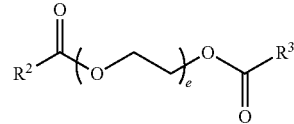
(2)

wherein $R^2$ and $R^3$ are the same or different and each represent a C6-C26 hydrocarbon group, and e represents an integer; and
2 to 45 parts by mass, per 100 parts by mass of the rubber component, of carbon black having a nitrogen adsorption specific surface area ($N_2SA$) of 20 to 200 m²/g, and optionally silica, a combined amount of carbon black and silica being 20 to 45 parts by mass per 100 parts by mass of the rubber component.

2. The rubber composition for tires according to claim 1, wherein the rubber composition comprises, based on 100% by mass of the rubber component, 15 to 70% by mass of the non-oil extended polybutadiene rubber or 5 to 50% by mass of a polybutadiene rubber component contained in the oil extended polybutadiene rubber, or
wherein the rubber composition comprises, based on 100% by mass of the rubber component, 15 to 70% by mass of the non-oil extended polybutadiene rubber and 5 to 50% by mass of a polybutadiene rubber component contained in the oil extended polybutadiene rubber.

3. The rubber composition for tires according to claim 1, wherein the non-oil extended polybutadiene rubber has a Mooney viscosity ($ML_{1+4}$, 100° C.) of 60 or more.

4. The rubber composition for tires according to claim 1 further comprising a petroleum-derived wax,
wherein an amount of the petroleum-derived wax is 6.0 parts by mass or less per 100 parts by mass of the rubber component.

5. The rubber composition for tires according to claim 4, wherein based on 100% by mass of the petroleum-derived wax, a combined amount of C20 to C32 normal alkanes is 25 to 50% by mass and a combined amount of C33 to C44 normal alkanes is 25 to 50% by mass.

6. The rubber composition for tires according to claim 1, which is a rubber composition for tire outer layers.

7. A pneumatic tire, formed from the rubber composition according to claim 1.

8. The rubber composition for tires according to claim 2, wherein the non-oil extended polybutadiene rubber has a Mooney viscosity ($ML_{1+4}$, 100° C.) of 60 or more.

9. The rubber composition for tires according to claim 2 further comprising a petroleum-derived wax,
wherein an amount of the petroleum-derived wax is 6.0 parts by mass or less per 100 parts by mass of the rubber component.

10. The rubber composition for tires according to claim 3 further comprising a petroleum-derived wax,
wherein an amount of the petroleum-derived wax is 6.0 parts by mass or less per 100 parts by mass of the rubber component.

11. The rubber composition for tires according to claim 2, which is a rubber composition for tire outer layers.

12. The rubber composition for tires according to claim 3, which is a rubber composition for tire outer layers.

13. The rubber composition for tires according to claim 4, which is a rubber composition for tire outer layers.

14. The rubber composition for tires according to claim 5, which is a rubber composition for tire outer layers.

15. A pneumatic tire, formed from the rubber composition according to claim 2.

16. A pneumatic tire, formed from the rubber composition according to claim 3.

17. A pneumatic tire, formed from the rubber composition according to claim 4.

18. A pneumatic tire, formed from the rubber composition according to claim 5.

19. A pneumatic tire, formed from the rubber composition according to claim 6.

* * * * *